US010930173B2

(12) United States Patent
Rayat

(10) Patent No.: US 10,930,173 B2
(45) Date of Patent: Feb. 23, 2021

(54) METHODS AND SYSTEMS FOR GAMIFICATION OF STARTUP INVESTING

(71) Applicant: Sarbjeet S. Rayat, Norwalk, CT (US)

(72) Inventor: Sarbjeet S. Rayat, Norwalk, CT (US)

( * ) Notice: Subject to any disclaimer, the term of this patent is extended or adjusted under 35 U.S.C. 154(b) by 0 days.

(21) Appl. No.: 16/453,591

(22) Filed: Jun. 26, 2019

(65) Prior Publication Data

US 2019/0392732 A1 Dec. 26, 2019

Related U.S. Application Data

(60) Provisional application No. 62/690,121, filed on Jun. 26, 2018.

(51) Int. Cl.
*G06Q 40/06* (2012.01)
*G09B 19/18* (2006.01)

(52) U.S. Cl.
CPC ............ *G09B 19/18* (2013.01); *G06Q 40/06* (2013.01)

(58) Field of Classification Search
CPC .......... A63F 2300/575; G07F 17/3255; G06Q 40/06; G09B 19/18
See application file for complete search history.

(56) References Cited

U.S. PATENT DOCUMENTS

| | | | | |
|---|---|---|---|---|
| 2005/0272495 A1* | 12/2005 | Penner | .................... | G06Q 40/00 463/1 |
| 2006/0155617 A1* | 7/2006 | Dasilva | .................. | G09B 19/18 705/30 |
| 2006/0202417 A1* | 9/2006 | DeLaCruz-Newlan | ...................... | A63F 3/02 273/242 |
| 2007/0129125 A1* | 6/2007 | Van Luchene | ......... | G06Q 30/04 463/1 |
| 2008/0207333 A1* | 8/2008 | Johnson | ................ | A63F 13/798 463/42 |
| 2009/0215537 A1* | 8/2009 | Poff | ........................ | G07F 17/32 463/42 |
| 2009/0259537 A1* | 10/2009 | Veksler | ................ | G06Q 20/102 705/14.4 |
| 2010/0124986 A1* | 5/2010 | Van Luchene | .......... | A63F 13/12 463/25 |
| 2011/0229860 A1* | 9/2011 | Leventhal | .............. | G09B 19/00 434/107 |

(Continued)

*Primary Examiner* — Malina D. Blaise
(74) *Attorney, Agent, or Firm* — RC Trademark Company

(57) ABSTRACT

According to some embodiments, an investment teaching system and method is provided. The system comprises a processor, an investment training server, and a non-transitory computer-readable medium comprising processor steps that when executed by the processor perform a method for teaching about investing using an investment game. The method comprises assigning, an allotment of virtual money to each of a plurality of game participants. Each of the plurality of game participants are assigned a portion of the total allotment of virtual money. In response to hearing a pitch from one of the plurality of game participants, a simulated investment amount is received at one of a plurality of game participant devices. The simulated investment amount is transmitted to the investment training server. A determination of a winner is received where the determination is based on a total of simulated investment amounts received from the plurality of participants.

18 Claims, 7 Drawing Sheets

(56) References Cited

U.S. PATENT DOCUMENTS

| | | | | |
|---|---|---|---|---|
| 2012/0283005 A1* | 11/2012 | Van Luchene | .......... | G07F 17/32 |
| | | | | 463/25 |
| 2012/0283024 A1* | 11/2012 | Van Luchene | .......... | G07F 17/32 |
| | | | | 463/42 |
| 2013/0231189 A1* | 9/2013 | Beeler | ..................... | A63F 13/65 |
| | | | | 463/42 |
| 2014/0075004 A1* | 3/2014 | Van Dusen | ............. | H04L 41/04 |
| | | | | 709/223 |
| 2017/0113144 A1* | 4/2017 | McDonald | ............. | G06Q 50/00 |

\* cited by examiner

600

Assign a total allotment of virtual money for distribution among a plurality of game participants, wherein each of the plurality of game participants are assigned a portion of the total allotment of virtual money
610

In response to hearing a pitch from one of the plurality of game Participants, receiving, from one of a plurality of game participant devices, a simulated investment amount at an investment training server 620

Transmit a determination of a winner based on a total of simulated investment amounts received from the plurality of participants 630

Assign an allotment of virtual money to each
of the plurality of game participant          710

In response to hearing a pitch from one of the plurality of game
Participants, receiving, from one of a plurality of game participant devices,
a simulated investment amount at an investment training server  720

Transmit a determination of a winner based on a total of simulated
investment amounts received from the plurality of participants  730

FIG. 7

METHODS AND SYSTEMS FOR GAMIFICATION OF STARTUP INVESTING

BACKGROUND

Gamification is the application of game-design elements and game principles in non-game contexts. Gamification commonly employs game design elements to improve user engagement, organizational productivity, flow, learning, crowdsourcing, employee recruitment and evaluation, ease of use, usefulness of systems, physical exercise, traffic violations, voter apathy, and more. A collection of research on gamification shows that a majority of studies on gamification find it has positive effects on individuals. However, individual and contextual differences exist. Gamification can also improve an individual's ability to comprehend digital content and understand a certain area of study such as music.

Gamification techniques are intended to leverage people's natural desires for socializing, learning, mastery, competition, achievement, status, self-expression, altruism, or closure, or simply their response to the framing of a situation as game or play. Early gamification strategies use rewards for players who accomplish desired tasks or competition to engage players. Types of rewards include points, achievement badges or levels, the filling of a progress bar, or providing the user with virtual currency. Making the rewards for accomplishing tasks visible to other players or providing leader boards are ways of encouraging players to compete.

Another approach to gamification is to make existing tasks feel more like games. Some techniques used in this approach include adding meaningful choice, onboarding with a tutorial, increasing challenge, and adding narrative.

Learning how to attract investors for a startup business may be a daunting and scary task that may only be learned through experience. Learning how to invest in startups can also be a high risk activity. It would therefore be desirable to provide a game that teaches students how to attract investors for a startup business, evaluate new ideas, evaluate new ventures and evaluate the risks involved in investing in new ventures.

BRIEF DESCRIPTION OF THE DRAWINGS

FIG. 6 illustrates a method according to some embodiments.

FIG. 7 illustrates a method according to some embodiments.

DETAILED DESCRIPTION

Figure 1:
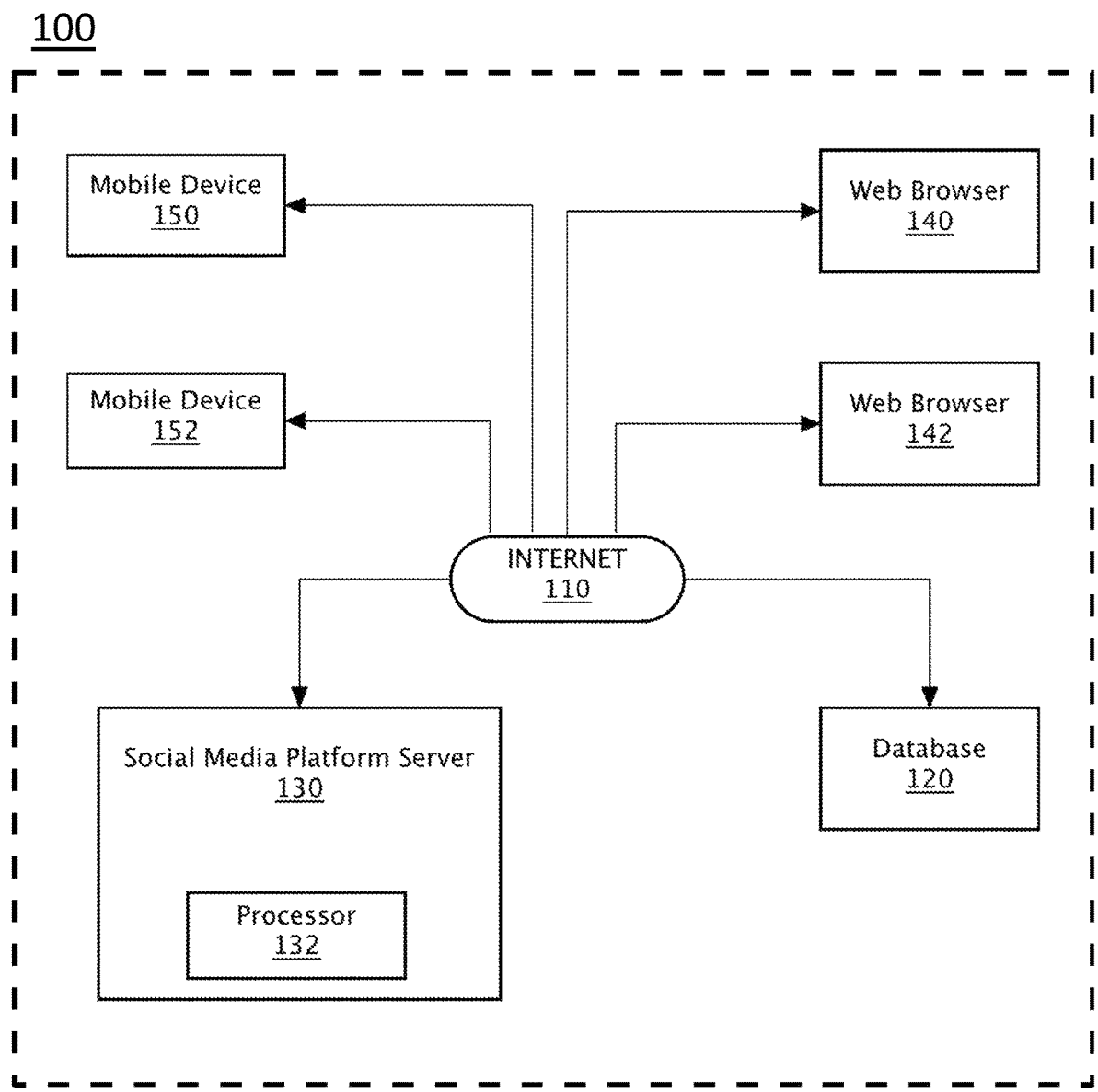
FIG. 1 illustrates a social media platform according to some embodiments.

The present embodiments relate to a method and system for gamification of investing in early stage companies hereinafter referred to as startups by enabling a plurality of individuals to earn recognition and prizes for successfully investing virtual money in a plurality of startups or a plurality of startups to earn recognition and prizes by successfully raising virtual money from a plurality of individuals.

The disclosed method for gamification of investing in startups may be beneficial to startups, users playing as investors on the platform, to real investors, to consultants, attorneys, accountants and other service providers to startups, and to organizers of pitch events. The players may benefit because they are entertained and provided an opportunity to learn about investing and to win prizes at no cost other than time spent managing their portfolio of product markers. Startups may benefit because the game may draw public attention to their startups, and because players who have placed investments in their startups may be implicitly incentivized to advertise those startups to their social networks via social media, email, and/or offline personal relationships, or even make their own real investments when the opportunity arises. The organizers of pitch events may benefit because the gamification of pitch events may increase the engagement of the audience with the pitches and increase the attendance at their pitch events. Real investors may benefit because the level of interest a startup is receiving from the players on the platform may serve as an indicator of market interest in that startup, which may help them identify popular and trending startups. Service providers may benefit because it can help them to identify the startups they want to engage with and to identify areas specific to those startups that those startups may need help with.

For the purpose of this application, some terms are hereby explained to carry the following meanings. These meanings are explained only to maintain a consistency of terms across the document and are not to be interpreted as definition and scope of the claims. A pitch may be defined as a presentation describing a business opportunity with the intention of securing resources to develop the idea further. A pitch may be in person or on video. A pitch event may be defined as an event where one or more businesses in varying stages make pitches to an audience. A pitch competition may be defined as a pitch event where participants who are making pitches compete with each other to win prizes. A startup may be defined as an early stage company that has not yet reached the stage of an initial public offering. Virtual money may be defined as unregulated digital money which is issued and controlled by the developers of the training system described herein and may be used and accepted among the members of this specific virtual community using the embodiments described herein. It may be possible to buy virtual money with real money. Virtual shares of a company may be defined as unregulated digital shares of a company issued and controlled by the developers of the training system described herein and used and accepted among the members of this specific virtual community using the training system described herein. It is possible to buy virtual shares with real money. Virtual shares may comprise fictional shares and do not give their holders any legal rights in the actual company. An attendee may be defined as any person who attends or views a pitch event irrespective of the fact whether the attendee plays the game of investing in one or more startups and/or rating the pitches.

Now referring to FIG. 1, a platform 100 is illustrated according to some embodiments. As shown, platform 100 may include a platform server 130 comprising a processor 132 that is adapted to perform functions based on software instructions, to implement the functionality described in the various embodiments described herein. The processor 132 may comprise a commercially available Central Processing Units (CPUs) in the form of a one-chip microprocessor(s). Server 130 may be in communication (e.g., via the Internet 110, local network or direct connection, or a cloud computing system), with one or more mobile devices 150, 152, (e.g., cell phones, tablet computers, laptops) and with one or more web browsers 140, 142 that may be associated with various computing devices. Mobile devices 150, 152 may use native apps or web browsers 140, 142 to communicate with the internet. Mobile devices 150, 152 and/or web browsers 140, 142 might be used by end users who are attending a pitch event such as, but not limited to, an audience participant, an investor, an event host, a pitch presenter, and/or a user consuming the event in the social media platform. Mobile devices 150, 152 and/or web browsers 140, 142 may also be used by system administrators of server 130 for performing administrative and maintenance functions of server 130. Server 130 may also be used in communication, via the Internet 110 (or, alternatively, via a local network or direct connection), with a database 120, which may be used for storing various data for implementing the functionality described in various embodiments of the invention herein, including user-generated content.

Figure 2:
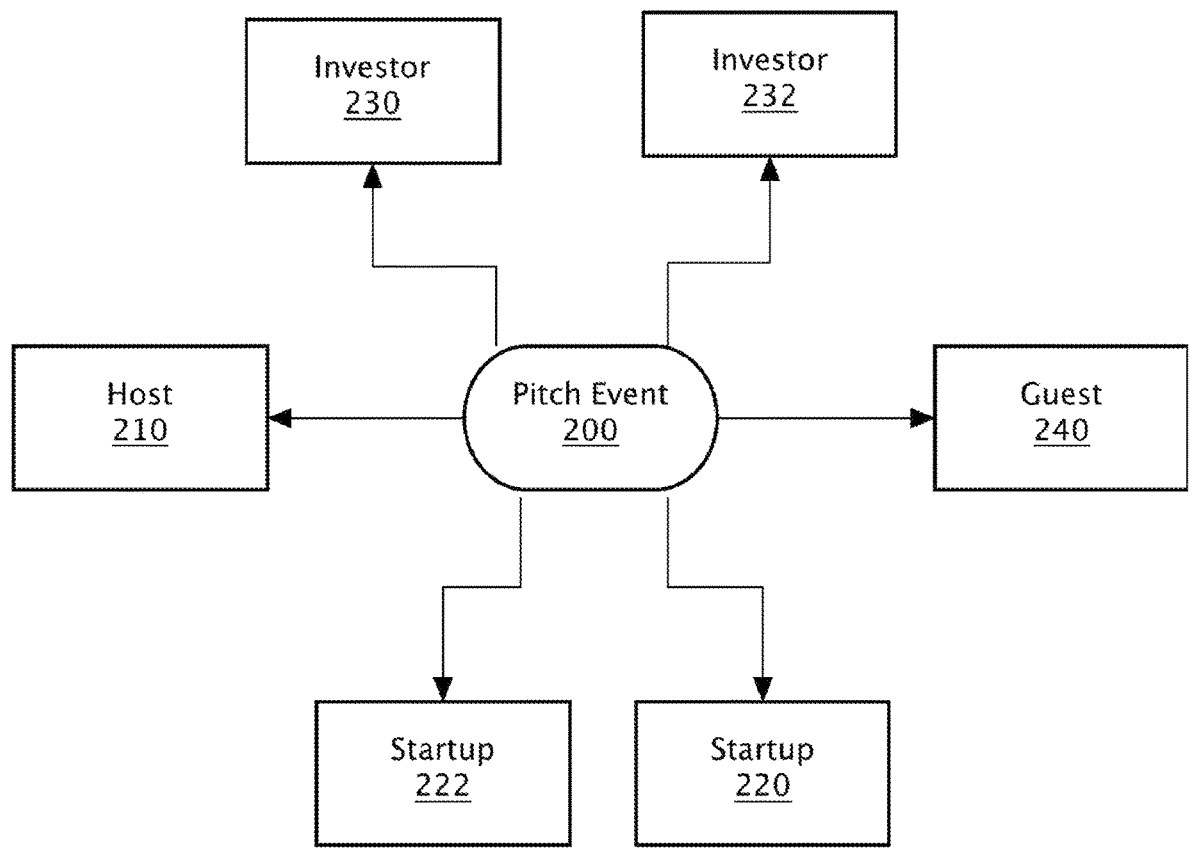
FIG. 2 illustrates a pitch event and the various participants and roles associated with the event according to some embodiments.

In one embodiment, a method of gamification of investing in early stage companies hereinafter referred to as startups is provided by enabling a plurality of individuals to earn recognition and prizes for successfully investing virtual money in a plurality of startups. For example, in one embodiment, one or more startups may pitch their idea, product or business to a plurality of attendees at a pitch event. Referring to FIG. 2, a Host 210 may set up a game around a pitch event 200, the pitch event featuring one or more startups 220, 222. The host 210 may set the criteria for users to rate the startups 220, 222 and based on their pitch. The host 210 may also set the investment amount featuring virtual money that may be available for each attendee to invest in the startups 220, 222. Once the game parameters are set, the host 210 may receive an authorization code that the host 210 shares with the attendees. The attendees who participate in the pitch event 200 game by investing virtual money in the startups 220, 222 and rating the startups as per the criteria are referred to as investors 230, 232 in the context of the pitch event 200 game. The attendees who do not invest in the startups, and who do not rate the startups, are referred to as guests 240. The guests 240 may rate the startups separately 220, 222 but not on the criteria in the context of the game. In other words, the guests 240 may use a different set of criteria for rating the startups than the investors 230,232. Ratings of startups may be used to determine a winner of the pitch event 200 game (e.g., a higher rating will be a determining factor in a winner of the pitch event game). The investors 230, 232 may decide how much of the fund they want to invest in the startups. They may invest all, part of, or none of the fund in the startups. Amount attracted by each of the startups at the event is calculated as one of the measures of their performance and this information may be used to prepare a leaderboard for the startups for the event and made available to the attendees and the startups. Detailed results of each startup's performance may be provided to users authorized by the system. The investors startups 220, 222 may receive rewards which may be in one or more forms including, but not limited to, badges, medals, trophies in physical and/or digital format, virtual money, real money, access to events, and networks and more. In some embodiments of the pitch event 200 game, the return on investment may be calculated for each of the investors 230, 232 as one of the measures of their performance as investors. Based on their performance, an investor leaderboard may be prepared, the investors 230, 232 may receive rewards which may be in one or more forms including, but not limited to, badges, medals, trophies in physical and/or digital format, virtual money, real money, access to events, networks and more.

In various embodiments, the pitch event 200 game may be conducted entirely offline, entirely online or in a hybrid environment. In an entirely offline environment, organizers of the pitch event, the startups, and the attendees may be present at the pitch event. Rules and information about the game may be shared with the attendees orally, projected on screens, or on printed matter. Startups may deliver their pitch in person to the attendees. The attendees may record (i) their investments in startups and (ii) ratings of startups, on tools including but not limited to paper, pen, cards, and digital devices comprising tablets, computers, or clickers. The data collected from the attendees may be processed manually or entered into one or more computing device to calculate the results. The results may be shared with the attendees orally, on screens via a projector or transmitted directly to a phone, tablet or other mobile device.

In an embodiment of an entirely online environment, the startups may deliver their pitch online via real-time streaming audio/video or asynchronously via an audio/video that has been prepared and uploaded on the ahead of time (e.g., stored on the internet or other cloud device). The attendees may watch the video pitches on computers, mobile devices, or TV and may use their computers, mobile devices or other electronic devices to rate the pitches and to make investments in the startups using the investment fund of virtual money allocated to them by the host. The data may be collected from the attendees by the server 130, stored in the database 120, and processed by the system server 130 to compute the performances of startups and investors and display the results in several forms including but not limited to startup leaderboards for startup performance and investor leaderboards for investor performance, and for assigning rewards.

In a hybrid environment, some aspects of the game may be carried out online and other aspects may be carried out off-line. In an embodiment of a hybrid environment of the game, startups may pitch in person at an event, and the attendees may use an application (e.g., an app) that is downloaded to their mobile devices or accessed via a web browser on their computing devices to rate the pitch and to invest in the startups. The application may collect the data and stores it in the database, algorithms in the application, via the processor, may calculate the performance of the startups and the performance of the attendees as investors. The algorithms, via the processor, may also determine the leaderboards for startups and investors and the applicable awards for the attendees. In some embodiments of a hybrid environment, startups may pitch online via a real time streaming audio/video or a pre-recorded audio video and the audience attending the event in person may record (i) their investments in startups and (ii) ratings of startups, on tools including but not limited to paper, pen, cards, and digital devices comprising tablets, computers, or clickers. The data collected from the attendees may be processed manually or entered into one or more computing device to calculate the results. The results may be shared with the attendees orally, on screens via a projector or transmitted directly to a phone, tablet or other mobile device.

In some embodiments, attendees may be rewarded with badges, or other prizes or rewards as an incentive for their performance. In one embodiment, the attendee who accumulates the most badges at an end of each calendar month is deemed the winner for that month, or the attendee who has a highest return on investment for a quarter may be declared the winner for that quarter. In some embodiments, the startup that attracts the most investment at the end of each week may be deemed the winner for that week. In some embodiments, a plurality of measures of the investors' performance including but not limited to the total return on investment on investments in selected events, number of events participated in are used to calculate their position on the world rankings of investors among users of this system. In another embodiment, a plurality of measures of the startups' performance including but not limited to the total virtual money raised in selected events, ratings, number of events participated in are used to calculate their position on the world rankings of startups among users of this system.

In one embodiment, a user may invest anonymously such that the user's identity is not shared with other users, although the administrator can identify the user for purposes of calculating rewards and tracking investor performance. In some embodiments, additional incentives may be provided to users to incentivize participation in the pitching events. For example, upon the occurrence of certain events or conditions, an investor may receive an additional weightage to their investment for a specific duration. For example, an investment of one unit of virtual money may count as 1.20 units of virtual money for a defined period of time. Those events or conditions might include, for example, the investor inviting a friend who signs up for the social media platform, the investor participating in a certain number of events per month, a startup exceeding a particular threshold of investment, or the like.

In one embodiment, a server for operating a startup investing platform with gamification of pitching events is provided. The server may be adapted to: permit a plurality of users to register as members of the gamification platform; permit a plurality of members to create games around pitching events; permit members to access the games created by other members of the gamification platform; permit members to rate the pitches by other members of the social media platform; invest virtual money in business listed on the platform; aggregate, over a time period, ratings and investments from a plurality of members; and declare a winner from among the plurality of members based on the aggregated ratings over the time period.

In still a further embodiment, a server for operating a platform having a main landing page or showcase page and a secondary display area for content accessible via a manual selection option is provided. In another embodiment, the server may be adapted to permit users to create a network, receive a network code, share the network code with other startups, investors or service providers to invite them to join their network, and host events for users in that network. The platform may be accessible via methods including but not limited to web browsers and native mobile apps.

In one embodiment, startups that meet certain trending criteria may be displayed in the list of trending startups that may be displayed on one or more pages on the platform. The trending criteria may include factors such as, but not limited to, an amount of virtual investment and/or ratings, and reviews the startups have received from users on the platform. This list may be automatically updated by the system every set period of time or manually updated by the administrator. In some embodiments, clicking on the startup name in the list may display information about the startup and information about the factors contributing to that startup being featured in the trending startups list. In some embodiments, similar to the trending startups list, a trending investors list may be prepared for the investors based on the performance of investors and may be displayed to users on the platform. In some embodiments, startups that meet certain criteria may be displayed in the list of world rankings of startups that may be displayed on one or more pages on the platform or the app. The world ranking criteria may include factors such as, but not limited to, an amount of virtual investment and/or ratings, and reviews the startups have received from users on the platform. This list may be automatically updated by the system every set period of time or manually updated by the administrator. In some embodiments, clicking on the startup name in the list may display information about the startup and information about the factors contributing to that startup being featured in the trending startups list. In some embodiments, similar to the world rankings of startups, a world rankings of investors may be prepared for the investors based on the performance of investors in selected events that meet certain criteria and this world rankings list may be displayed to users on the platform.

In some embodiments, profile pages to be maintained on the platform for startups and other users may include but not limited to angel investors, venture capital firms, mentors, and founders/cofounders of startups. In one embodiment, the profile page for a startup may display information including, but not limited to, their performance at pitch events that the startup participated in, awards won by the startup at the events where the awards may be in various forms such as badges, medals, certificates, virtual money, and leaderboards, photos of founders and other team members of the startup, links to other social media accounts of the startup, address and other contact information associated with the startup, a message button for other users to leave a message for the startup, other user generated content uploaded on the page by the administrator of the startup.

In some embodiments, a profile page associated with an investor may display information including, but not limited to, one or more photos of the investor, information volunteered by the investor regarding the investor's past investment record, information about the pitch events that the investor participated in and the performance of the investor in those events, awards won by the investor at the events where the awards may be in various forms such as badges, medals, certificates, virtual money, and leaderboards, links to other social media accounts associated with the investor, address and other contact information associated with the investor, a message button for other users to leave a message for the investor, and other user generated content uploaded on the page by the investor.

In some other embodiment, a profile page of a mentor may display information including, but not limited to, one or more photos of the mentor, information volunteered by the mentor regarding the mentor's past record of mentoring startups, information about the pitch events that the startups associated with the mentor participated in and the performance of the startups in those events, awards won by the startups at the events where the awards may be in various forms such as badges, medals, certificates, virtual money, and leaderboards, links to other social media accounts associated with the mentor, address and other contact information associated with the mentor, a message button for other users to leave a message for the mentor, and other user generated content uploaded on the page by the mentor.

In some embodiments of the pitch game, users may raise an investment fund of virtual money from other users or receive an investment fund of virtual money for a certain duration of the game such as, but not limited to, a school term, a semester, a school year, a calendar year, a time period of one year or other time period that can extend over multiple pitches. The users may use the fund on a rolling basis to invest in startups listed on the platform. In one embodiment, the investors may use the fund to invest in startups only at pitch events. In other embodiments, investors may use the fund to invest in startups on a rolling basis and outside the context of a specific pitch event. The startups may be evaluated on a plurality of parameters for their performance including but not limited to investment amount attracted by the startups from attendees in pitch events, awards won at pitch events, ratings from attendees at pitch events, investment attracted on a rolling basis on the platform outside the pitch event, ratings and reviews received from sources other than attendees at the pitch events, actual investment received from investment rounds such as seed round, Series A, B, C and so on with real money, such information being self-reported by the startups and/or collected and verified from various other sources. At the end of the duration of the game, results may be calculated for the performance of the investors and of the startups, with performance of investors being some function of the performance of startups, corresponding leaderboards prepared for startups and investors, and awards given to winners. With the start of the next cycle, the investment fund may be reset for all users to a fixed same amount in one embodiment. In other embodiment, the investment fund available for an investor in the next cycle is a function of the performance of the investor in the previous cycle. In some embodiments, results may be calculated for the performance of funds and prizes awarded to funds with best performance on selected criteria.

In some embodiments, if users exhaust their investment fund of virtual money but want to continue playing at investing in startups, they may add virtual money to their investment fund in various ways including but not limited to borrowing against an investment fund available to them in the future, buying it with real money, or trading their medals, badges, certificates and other awards won in previous games.

In yet another embodiment, users may acquire virtual shares of startups that they invest their virtual money in. In one embodiment, the startups may define the policy and terms of the offer of their virtual shares to users. In some embodiments, the terms of offer of virtual shares of startups listed on the platform may be decided by the administrator of the gaming platform and/or the algorithms of the gaming platform system whereas in some embodiments, the terms of offer of the virtual shares of a startup are determined in part by the startup and in part by the administrator of the gaming platform. A startup's virtual shares acquired by users may be traded amongst the users and/or exchanged with other users including but not limited to investors, startups, guests or administrators on the platform for virtual money. The value of the virtual shares of a startup change with certain factors including but not limited to the performance of the startup on the gaming platform. In another embodiment, users may be allowed to trade virtual shares of only certain startups that are selected on criteria including but not limited to the startup's performance on the gaming platform. In some other embodiment, only certain users that meet specific criteria including but not limited to their performance on the gaming platform may be allowed to trade virtual shares of selected startups. In another embodiment, trading activity of users may affect their performance on the gaming platform and trading activity of the startup's shares may affect the startup's performance on the gaming platform. In another embodiment, listed startups not meeting the administrator's criteria may be delisted when they fail to adhere to the standards and policies laid down by the administrator of the gaming platform and, as a result, users may no longer be able to trade virtual shares of the delisted startups.

In some embodiments, resources may be provided on the platform to users in the form of including but not limited to pitch calendar featuring pitch events across the world, videos, articles and essays on preparing pitch decks and pitching to investors, strategies on investing in startups, articles on SEC regulations regarding investing in startups, videos, articles and essays featuring various aspects of the journey from a product idea to product development, marketing, and successful exits. The embodiments described herein may be used in educational institutions by instructors of entrepreneurship or related courses in which students prepare and present business plans. In another embodiment, users may be incentivized to read articles, watch videos, take quizzes or polls, submit articles, share links on topics of investing and startups by offering them virtual money that gets added to their account balance and which they can then use to invest in startups.

Referring to FIG. 2, in one such embodiment, an instructor may act as a host 210 for business plan presentations by the students in an event organized as a pitch event 200. Attendees of the presentations may be students of the same or different classes, guests may be other instructors or external judges invited to the event. The student or team presenting the business plan may play the role of startup 220, 222, and other attendees may play the role of investors 230, 232 or as guest 240. The investors 230, 232 may rate each presentation on the criteria set by the host 210 and may invest the amount set by the host 210 in the startups 220, 222 that present their business plans. At the end of presentations, results may be computed for performance of the startups and investors, corresponding leaderboards prepared for startups and investors, and awards given to winners. In some embodiment, an instructor may use the results of the game as an input for the peer-evaluation component of the student's grade for the business plan presentation. The invention provides both an educational experience and a competitive challenge among players while simulating a business startup pitching to investors to its initial public offering.

The present embodiments may be used in pitch competitions. Referring again to FIG. 2, in one such embodiment, an organizer of the pitch competition event may act as the host 210 for pitches by startups selected for the pitch event 200. Attendees of the pitch event 200 may play the role of investors 230, 232 or as guests 240. The investors 230, 232 may rate pitches on the criteria set by the host 210 and may invest the amount set by the host 210 in the startups 220, 222 that deliver their pitch. At the end of pitches, results may be computed for performance of the startups and investors, corresponding leaderboards prepared for startups and investors, and awards given to winners. In one embodiment, all investors' investments and ratings weigh the same whereas in other embodiments, some selected investors' ratings and investments may be weighted higher based on certain criteria as compared with others playing the game.

Figure 3:
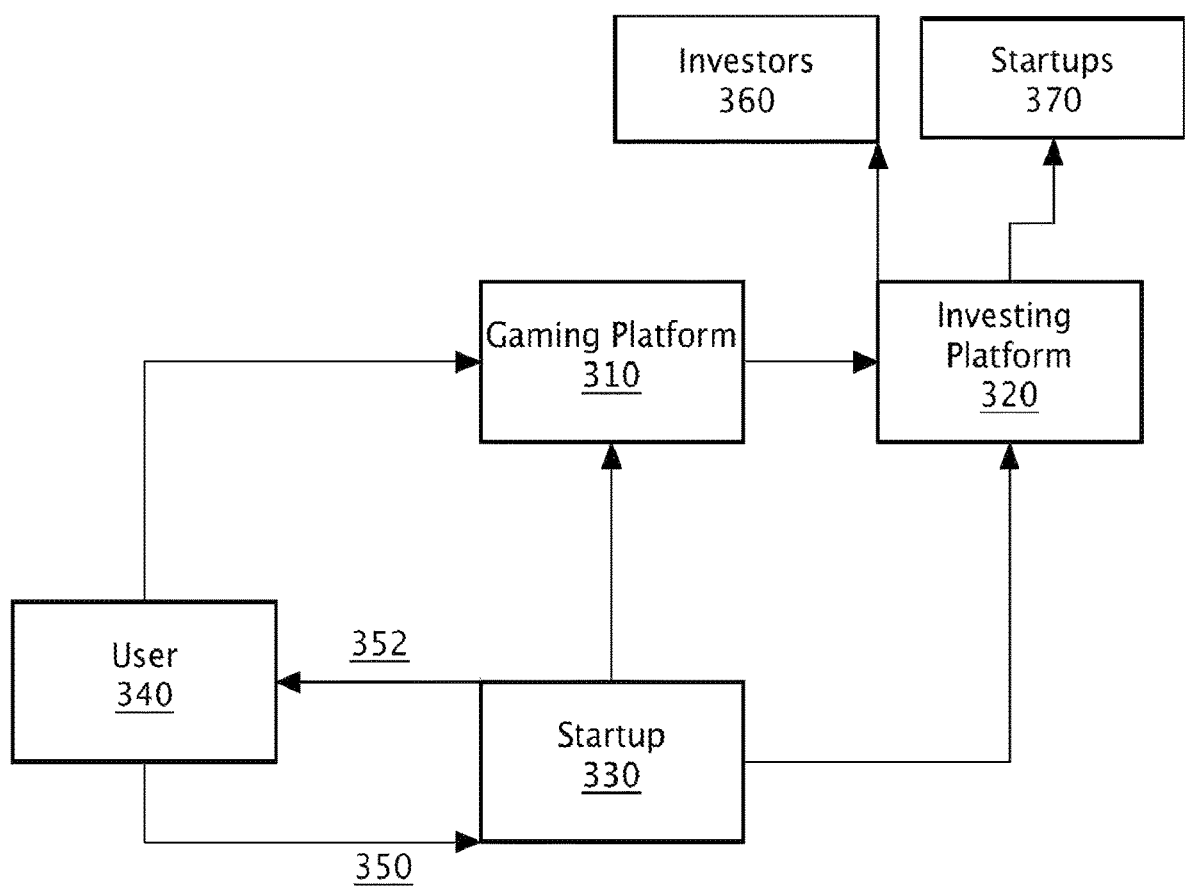
FIG. 3 illustrates an embodiment of a relationship between a social gaming platform and an external investing platform.

Referring to FIG. 3, the embodiments described herein may be used with other investing platforms 320 that offer accredited and unaccredited investors 360 the ability to invest in early stage companies/startups 370 with real money. Based on the activities, interests and performance associated with a user 340 in the role of an investor on the platform 310 of this proposed invention, a user 340 may be provided recommendations, discounts, priorities, preferences for investing in startups 370 on the other investing platforms 320. In one embodiment, the user 340 who has invested 350 in a startup 330 on the gaming platform 310 is rewarded with discounted shares 352 by the startup 330 that may also be listed on an investing platform 320. In some embodiments, users 340 on the gaming platform 310 can be provided with rewards in the form of cryptocurrencies for investing in startups 370, 330 listed on Investing Platforms. In some embodiments, performance of startups on this gamified system may determine their participation on other investing platforms 320.

Figure 4:
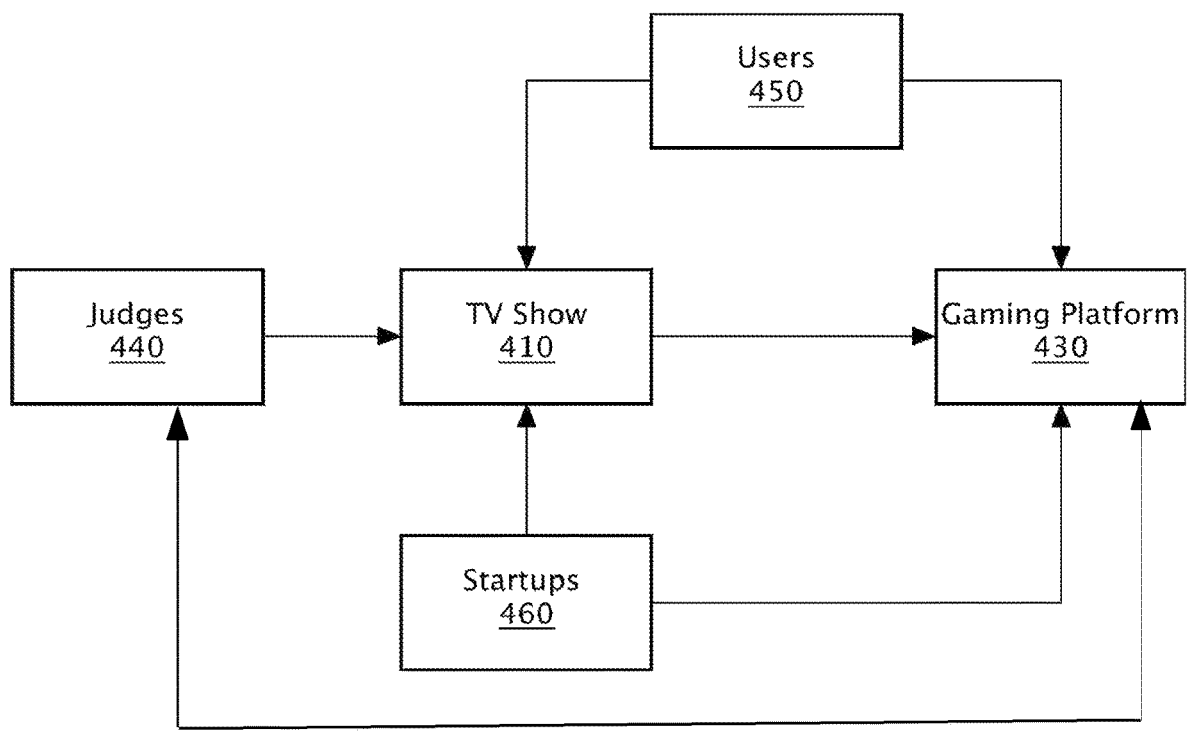
FIG. 4 illustrates an embodiment of a TV show or an internet show telecasting a pitch event.

Gamification of pitch events may be extended to pitch events on recorded and/or live TV shows, for example, Shark Tank. Referring to FIG. 4, in some embodiments, when a show 410 featuring a pitch event is being telecast on TV or on the internet, users 450 watching the show may invest virtual money in the startups 450 featured on the show by signing in on the gaming platform 430 and following the instructions listed for that event. The instructions may include information about how much investment fund is available for each user to invest in the startups 460 featured in the specific episode of the show 410, and a rating scale to rate the startups 460 and/or the pitch. When the last of the pitch ends on the show, the server/processor of the gaming platform 430 may calculate the performance of each startup 460 featured on the show 410 and displays the results of each startup's performance that may be a function of, including but not limited to, the total investment attracted by that startup from the users 450 of the gaming platform. Also calculated may be the performance of users 450 playing as investors, wherein the performance would be some function of the amount invested by an investor in the startup and the performance of the startup. Startup and investor leaderboards may be constructed and displayed and awards announced. In some embodiments, the TV show 410 may use the results of the startup and investor leaderboards to announce its own awards to the winners on the show. In some embodiments, in the calculation of results, the TV show Judges' 440 evaluations of the startups 460 may carry more weight than the users 450 and the judges' weighted evaluations would be taken into consideration when determining the startup and investor leaderboards. In some embodiment, judges' results may be calculated and displayed separately from rest of the participants in the game.

In one embodiment, scores or performances of users as startups and/or investors may be calculated and made available as reports to the users or other entities authorized by the users. These reports may be displayed in one or more formats of text, numbers, tables, badges, charts, graphs, audio, and video. In some embodiments of displaying the scores, a user's scores can highlight or provide links to specific sources of data that contribute to the user's respective score or scores.

In some embodiments, gamification of investing in startups as described in all the preceding embodiments may be enabled on a gaming platform with the use of various cryptocurrencies.

Figure 5:
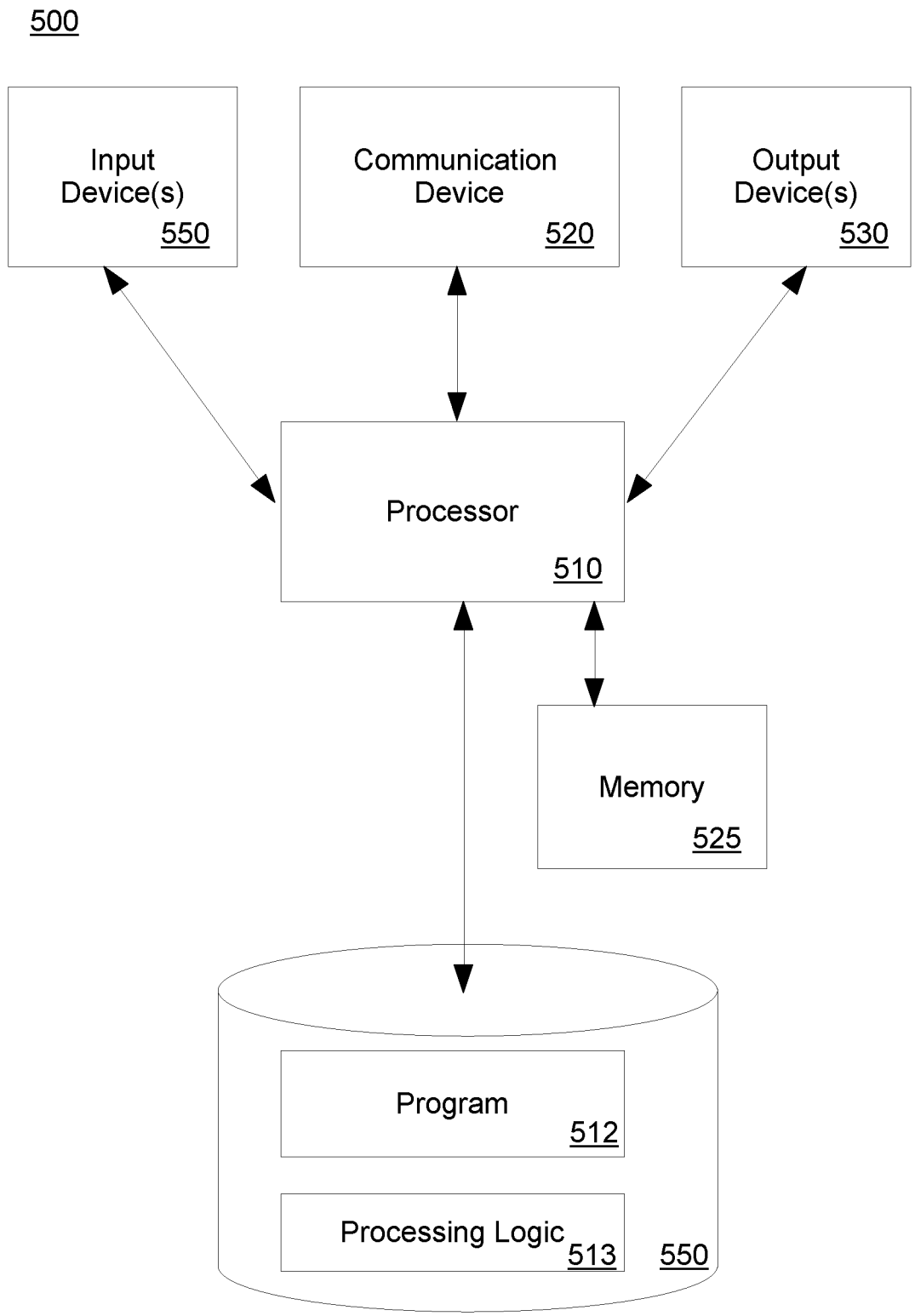
FIG. 5 illustrates a game server according to some embodiments.

Note the gaming platform described herein may be implemented using any number of different hardware configurations. For example, FIG. 5 illustrates a gaming platform 500 (e.g., an investment teaching system) that may be, for example, associated with the platform server 130 of FIG. 1 or the gaming platform 310 of FIG. 3. The gaming platform 500 may provide a technical and commercial advantage by being able to provide simulated investment training and teaching system that is designed for students in an academic setting.

The gaming platform 500 may comprise a processor 510 ("processor"), such as one or more commercially available Central Processing Units (CPUs) in the form of one-chip microprocessors, coupled to a communication device 520 configured to communicate via a communication network (not shown in FIG. 5). The communication device 520 may be used to communicate, for example, with one or more machines on a network such as, but not limited, to mobile or computing devices that are used by participants in a pitch event game. The gaming platform 500 further includes an input device 540 (e.g., a mouse and/or keyboard to enter information about pitches, startups and investors) and an output device 550 (e.g., to output and display the data and/or alerts).

The processor 510 also communicates with a memory 525 and storage device 550 that stores data 515. The storage device 550 may comprise any appropriate information storage device, including combinations of magnetic storage devices (e.g., a hard disk drive), optical storage devices, mobile telephones, and/or semiconductor memory devices. The storage device 550 may store a program 512 and/or processing logic 515 for controlling the processor 510. The processor 510 performs instructions of the programs 512, 513, and thereby operates in accordance with any of the embodiments described herein. For example, the processor 510 may receive data from a plurality of users playing the pitch event game and may act on the data based on instructions of the programs 512, 513.

The programs 512, 513 may be stored in a compiled, compressed, uncompiled and/or encrypted format or a combination. The programs 512, 5135 may furthermore include other program elements, such as an operating system, a database management system, and/or device drivers used by the processor 510 to interface with peripheral devices.

Now referring to FIG. 6, a method 600 that might be performed by platform server 130 of FIG. 1, or the gaming platform 310 of FIG. 3, is illustrated according to some embodiments. The flow chart described herein does not imply a fixed order to the steps, and embodiments of the present invention may be practiced in any order that is practicable. Note that any of the methods described herein may be performed by hardware, software, or any combination of these approaches. For example, a non-transitory computer-readable storage medium may store thereon instructions that when executed by a machine result in performance according to any of the embodiments described herein.

Method 600 may relate to a method of teaching about investing using through the use of an investment game. As will be appreciated by one skilled in the art, the present embodiments may be embodied as a system, method or computer program product. Accordingly, the embodiments described herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments described herein may take the form of a computer program product embodied in one or more computer readable medium(s) having computer readable program code embodied thereon.

Now referring to 610, a total allotment of virtual (e.g., play) money for distribution may be assigned among a plurality of game participants, wherein each of the plurality of game participants are assigned a portion of the total allotment of virtual money. In another embodiment, each of the plurality of game participants are assigned a fixed amount of virtual money for the event. In another embodiment, each of the plurality of game participants are assigned a fixed amount of virtual money per startup pitching at that event.

For purposes of illustrating features of the present embodiments, some simple examples will now be introduced and referenced throughout the disclosure. Those skilled in the art will recognize that these examples are illustrative and are not limiting and are provided purely for explanatory purposes. For example, a pitch event game may include four participants that are investing play money in response to hearing two different pitches (e.g., one from company A and one from company B). An investment teaching system, such as a game platform as described above, may allot $1000 in play money for the game with each participant receiving an equal share of $250 in play money to invest, or not invest, in the two pitches.

At 620, in response to hearing a pitch from one of the plurality of game participants, a simulated investment amount may be received from one of a plurality of game participant devices at an investment training server. Game participant devices may comprise a mobile device or other computing device that a participant may use to enter in a dollar amount that the participant wishes to invest in a company after hearing a pitch. The simulated investment amount associated with one or more of the plurality of game participants may receive an additional weightage for a specific duration of time. In some embodiments, weightage may be based on a number of investment teaching games participated in over a period of time and/or an associated performance in the number of investment teaching games participated in over the period of time. Continuing with the above example, a representative for company A provides a pitch regarding his new product in the hopes that he will attract investors. After hearing the pitch, a first participant may wish to invest $50 of his $250 allotment in company A. The other three participants may pass on investing after hearing this pitch by indicating to the mobile device that they are passing by pressing a "pass" icon or by investing $0. Likewise, a representative for company B provides a pitch regarding her new product. After hearing the pitch, all four participants may wish to invest $100 of their $250 allotment in the company B. The investment amounts indicated on the mobile devices are then transmitted to the game server.

Based on a total of simulated investment amounts received from the plurality of participants, a determination of a winner is transmitted to the mobile devices at 630. Continuing with the above examples, the game server determines that company B received $400 in investments and that company A received $50. Furthermore, the game server determines that company B is the winner. The game server may then transmit to the mobile devices that company B is the winner. In some embodiments, especially in the case of multiple pitches being presented, a leaderboard board comprising scores is displayed where the scores are based on the total simulated investment amounts received from the participants. In some embodiments, the investment training server may capture data associated with the participants. For example, the server may capture demographic data associated with each participant such as, but not limited to, an education level, an income amount, a location of each participant, and an age of each participant. This demographic data may be used to generate profiles of likely consumers based on an amount of play/virtual money each participant invested after hearing a particular pitch. The profiles of likely consumers may be transmitted to a presenter of a pitch to learn about a consumer base that would be interested in the products or services described in the pitch.

Similar to method 600, method 700 may relate to a method of teaching about investing using through the use of an investment game. Now referring to 710, an allotment of virtual money is assigned to each of a plurality of game participants. In some embodiments the allotment may be fixed. In other embodiments, the allotment may vary based on the participant. For example, a player's allotment may be based on a number of games already participated in, a performance in games participated in, real money paid to play the investment game and/or awards received from past investment games participated in. In some embodiments, each of the plurality of game participants are assigned a fixed amount of virtual money for the event. In some embodiments, each of the plurality of game participants are assigned a fixed amount of virtual money per startup pitching at that event.

At 720, in response to hearing a pitch from one of the plurality of game participants, a simulated investment amount may be received from one of a plurality of game participant devices at an investment training server. Game participant devices may comprise a mobile device or other computing device that a participant may use to enter in a dollar amount that the participant wishes to invest in a company after hearing a pitch. The simulated investment amount associated with one or more of the plurality of game participants may receive an additional weightage for a specific duration of time. In some embodiments, weightage may be based on a number of investment teaching games participated in over a period of time and/or an associated performance in the number of investment teaching games participated in over the period of time.

Based on a total of simulated investment amounts received from the plurality of participants, a determination of a winner is transmitted to the mobile devices at 730.

The process flow and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

This written description uses examples to disclose multiple embodiments, including the preferred embodiments, and also to enable any person skilled in the art to practice the invention, including making and using any devices or systems and performing any incorporated methods. Aspects from the various embodiments described, as well as other known equivalents for each such aspects, can be mixed and matched by one of ordinary skill in the art to construct additional embodiments and techniques in accordance with principles of this application.

It is to be understood that all of the embodiments described in this document are merely illustrative of numerous and varied other embodiments which may constitute applications of the principles of the invention. Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. An investment teaching system, the system comprising:
a plurality of game participant devices comprising computers or mobile devices; and
an investment training server comprising a processor and a non-transitory computer-readable medium where the non-transitory computer-readable medium comprises processor steps that when executed by the processor perform a method for teaching about investing using an investment game, the method comprising:
retrieving performance data, via the processor, associated with each of a plurality of game participants from a database where the performance data was collected via the investment training server, stored in a database and processed by the investment training server to compute the performances data;
in a case that an investment fund is based on a function of performance, assigning, via the processor, an allotment of virtual money to each of a plurality of game participants from the investment fund of virtual money wherein assigning is based on the retrieved performance data associated with each of the plurality of game participants performance in previous games;
in a case that the investment fund of virtual money is reset for all of the plurality of game participants, assigning, via the processor, a same allotment of virtual money to each of the plurality of game participants from the investment fund of virtual money;
in response to hearing a pitch from one of the plurality of game participants on one or more game participant devices, receiving, from the one or more of the plurality of game participant devices, one or more simulated investment amounts at the investment training server;
storing, via the processor, the one or more simulated investment amounts received at the investment training server in a database;
determining, via the processor, a first winner based on (i) totaling, for each participant, the one or more simulated investment amounts received from the plurality of participants that is stored in the database and (ii) determining which participant received the greatest simulated investment amount, wherein the first winner is a startup;
determining, via the processor, a second winner based on a return on investment where (i) a return on investment is calculated for each of the plurality of participants that transmit one or more simulated investment amounts to the investment training server and (ii) the return on investment is based on the one or more simulated investment amounts made by each of the one or more participants over a period of time, wherein the second winner is an investor;
transmitting, via the investment training server, the determination of the first winner or the second winner to the plurality of game participant devices; and
displaying the transmitted first winner or second winner on the plurality of game participant devices.

2. The investment teaching system of claim 1, wherein the method further comprises:
displaying a leaderboard comprising scores and ranks, wherein the scores and ranks are based on the total of simulated investment amounts received from the plurality of participants.

3. The investment teaching system of claim 1, wherein hearing the pitch comprises receiving a pitch on the one of the plurality of game machines via a streaming audio/video.

4. The investment teaching system of claim 3, wherein hearing the pitch is a real-time audio/video stream.

5. The investment teaching system of claim 3, wherein hearing the pitch is an asynchronously broadcast audio/video stream or a pre-recorded audio/video stream.

6. The investment teaching system of claim 1, wherein the simulated investment amount associated with one of the plurality of game participants receives an additional weightage for a specific duration of time.

7. The investment teaching system of claim 6, wherein the weightage is based on a number of investment teaching games participated in over a period of time and an associated performance in the number of investment teaching games participated in over the period of time.

8. A computer implemented method performed by a processor to teach about investing using an investment game, the method comprising:
retrieving, via the processor, performance data associated with each of a plurality of game participants from a database where the performance data was collected via the investment training server, stored in a database and processed by the investment training server to compute the performances data;
in a case that an investment fund is based on a function of performance, assigning, via the processor, an allotment of virtual money to each of a plurality of game participants from the investment fund of virtual money wherein assigning is based on the retrieved performance data associated with each of the plurality of game participants performance in previous games;
in a case that the investment fund of virtual money is reset for all of the plurality of game participants, assigning, via a processor, a same allotment of virtual money to each of the plurality of game participants from the investment fund of virtual money;
in response to hearing a pitch from one of the plurality of game participants on one or more game participant devices comprising computers or mobile devices, receiving, from the one or more of the plurality of game participant devices, one or more simulated investment amounts at the investment training server;

storing the one or more simulated investment amounts received at the investment training server in a database;

determining, via the processor, a first winner based on (i) totaling, for each participant, the one or more simulated investment amounts received from the plurality of participants that is stored in the database and (ii) determining which participant received the greatest simulated investment amount, wherein the first winner is a startup;

determining, via the processor, a second winner based on a return on investment where (i) a return on investment is calculated for each of the plurality of participants that transmit one or more simulated investment amounts to the investment training server and (ii) the return on investment is based on the one or more simulated investment amounts made by each of the one or more participants over a period of time, wherein the second winner is an investor; and transmitting, via the investment training server, the determination of the first winner or the second winner to the plurality of game participant; and displaying the transmitted first winner or second winner on the plurality of game participant devices.

9. The method of claim 8, wherein the method further comprises:
displaying a leaderboard comprising scores and ranks, wherein the scores and ranks are based on the total of simulated investment amounts received from the plurality of participants.

10. The method of claim 8, wherein the simulated investment amount associated with one of the plurality of game participants receives an additional weightage for a specific duration of time.

11. The method of claim 10, wherein the weightage is based on a number of investment teaching games participated in over a period of time and an associated performance in the number of investment teaching games participated in over the period of time.

12. A non-transitory computer-readable medium comprising processor steps that when executed by a processor perform a method for teaching about investing using an investment game, the method comprising:
retrieving, via the processor, performance data associated with each of a plurality of game participants from a database where the performance data was collected via the investment training server, stored in a database and processed by the investment training server to compute the performances data;
in a case that the investment fund is a function of performance, assigning, via the processor, an allotment of virtual money to each of a plurality of game participants from the investment fund of virtual money wherein assigning is based on the retrieved performance data associated with each of the plurality of game participants performance in previous games;
in a case that an investment fund of virtual money is reset for all of the plurality of game participants, assigning, via the processor, a same allotment of virtual money to each of the plurality of game participants from the investment fund of virtual money;
in response to hearing a pitch from one of the plurality of game participants on one or more game participant devices comprising computers or mobile devices, receiving, from the one or more of the plurality of game participant devices, one or more simulated investment amounts at the investment training server;
storing, via the processor, the one or more simulated investment amounts received at the investment training server in a database;
determining, via the processor, a first winner based on (i) totaling, for each participant, the one or more simulated investment amounts received from the plurality of participants that is stored in the database and (ii) determining which participant received the greatest simulated investment amount, wherein the first winner is a startup;
determining, via the processor, a second winner based on a return on investment where (i) a return on investment is calculated for each of the plurality of participants that transmit one or more simulated investment amounts to the investment training server and (ii) the return on investment is based on the one or more simulated investment amounts made by each of the one or more participants over a period of time, wherein the second winner is an investor; and
transmitting, via the investment training server, the determination of the first winner or the second winner to the plurality of game participant; and
displaying the transmitted first winner or second winner on the plurality of game participant devices.

13. The medium of claim 12, wherein the method further comprises:
displaying a leaderboard comprising scores and ranks, wherein the scores and ranks are based on the total of simulated investment amounts received from the plurality of participants.

14. The medium of claim 12, wherein the demographic information comprises, at least two of, an education level, an income amount, a location associated with each participant, and an age of each participant.

15. The medium of claim 14 wherein the method further comprises:
generating a profile of likely consumers based on the demographic information and an amount of the simulated investment amount each participant invested after hearing the pitch;
transmitting the generated profiles to a presenter of the pitch.

16. The medium of claim 13 wherein the method further comprises:
receiving a first rating of the pitch from the one of the plurality of game participant devices based on a first set of predetermined criteria set by a host of the investment game and wherein the scores associated with the leaderboard are further based on the first rating.

17. The medium of claim 16 wherein the method further comprises:
receiving a second rating of the pitch from a guest that is not a game participant based on a criterion set that is different than the first set of predetermined criteria, wherein the scores associated with the leaderboard are further based on the second rating.

18. The medium of claim 12, wherein the portion of the total allotment of virtual money is allotted for a school term, a semester, a school year, or a calendar year.

* * * * *